April 3, 1945.   F. WHEATLEY, SR   2,372,869
PLUG VALVE
Filed Sept. 1, 1943
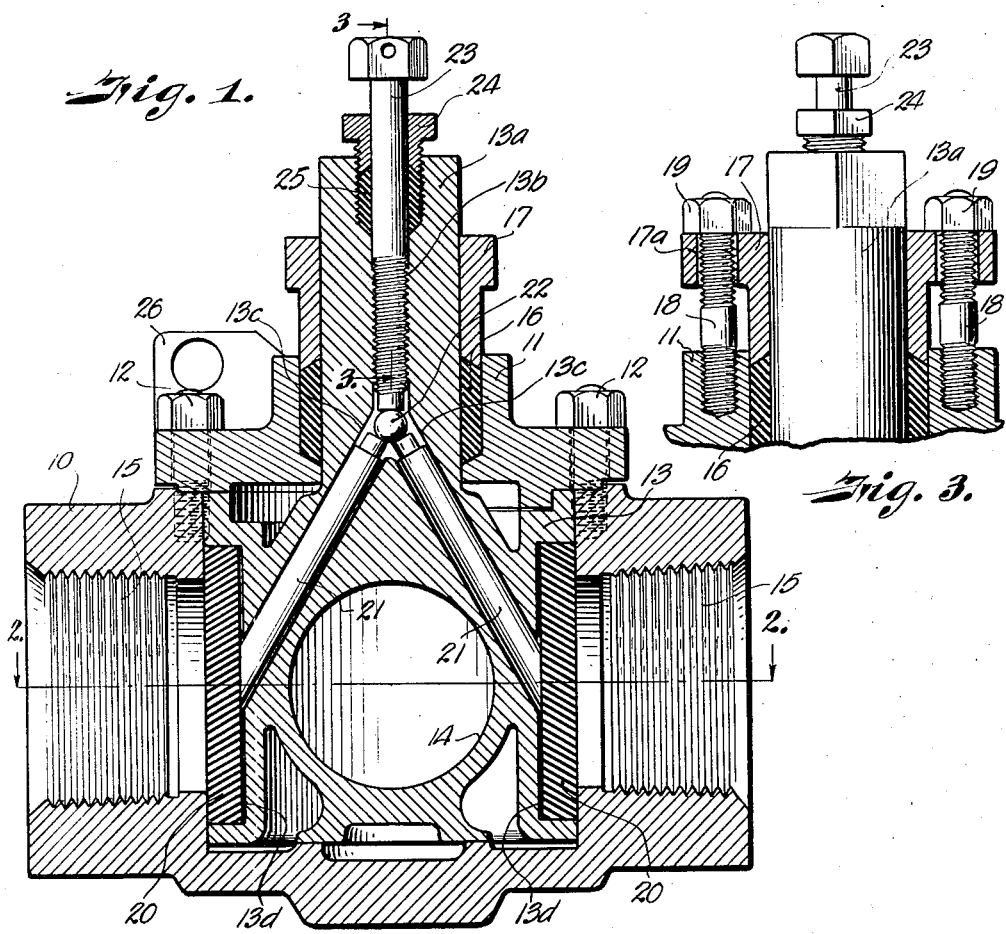
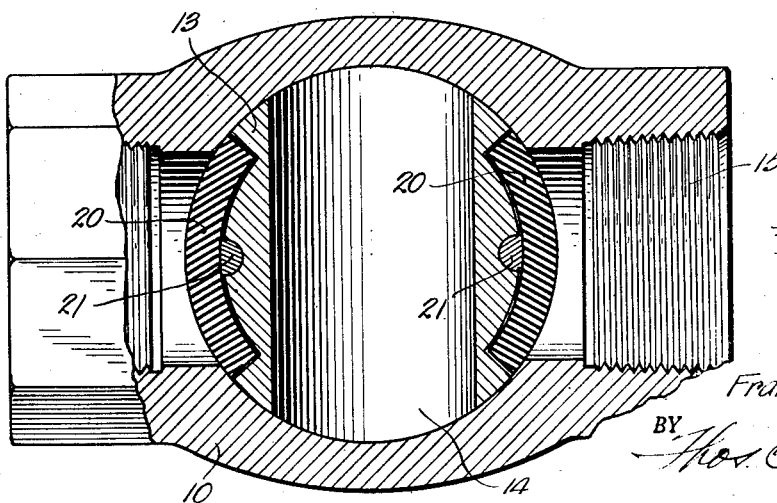
INVENTOR.
Frank Wheatley, Sr.
BY
ATTORNEY.

Patented Apr. 3, 1945

2,372,869

UNITED STATES PATENT OFFICE 2,372,869

PLUG VALVE

Frank Wheatley, Sr., Tulsa, Okla.

Application September 1, 1943, Serial No. 500,764

2 Claims. (Cl. 251—102)

My invention relates to improvements in plug valve construction and refers more particularly to a plug valve design which has mechanically operated closure members for the valve openings said closures functioned separately from the valve.

Among the advantages of the valve over conventional plug valves is the fact that it is fully opened upon a quarter turn, that it needs no lubrication, is rugged in construction, simple and expedient for any purpose or service as proven by a wide variety of exacting tests and that leakage through the valve may be eliminated by replacement of the closure members without changing the valve.

In the accompanying drawing which forms a part of the specification and is to be read in conjunction therewith, and in which like reference numerals are used to indicate like parts in the various views—

Fig. 1 is a center sectional view of the plug valve;

Fig. 2 is a view taken along the line 2—2 in the direction of the arrows;

Fig. 3 is a broken section taken along the line 3—3 of Fig. 1 in the direction of the arrows.

Referring to the drawing and particularly to Fig. 1, the valve consists of a body 10 having a top closure cap 11 which seals the top of the body and is held in place by bolts 12 or by stud bolts to which are screwed nuts corresponding to the hexagonal headed bolts shown in the drawing. Within the body 10 is a valve 13 which has a cylindrical passageway 14 therethrough. The valve opening 14 aligns itself with the end openings 15 of the valve body when the valve is open and is at right angles to the axis of the valve body or transversely positioned in the valve body as shown in Figs. 1 and 2 when the valve closed.

The valve 13 has an upper extension or valve stem 13a which extends through the cap 11 and has an upper squared end to which a wrench or handle is fitted to open and close the valve. This neck or valve stem 13a is sealed where it passes through the cap 11 by means of packing 16 held in place by means of a gland 17. Studs 18 screwed into the cap 11 shown in Fig. 3 are sufficiently long to pass through holes 17a drilled in ear extensions of the gland and being threaded at their upper ends received nuts 19 which draw the gland against packing 16 to assure a pressure-tight joint.

The valve stem 13a is drilled centrally to form a duct 13b. This central passageway communicates with two lateral passageways 13c forming a Y-shaped passageway through the body of the valve. These lateral passageways 13c terminate in cutout portions 13d formed in opposite sides of the valve 13. In these cutout portions of the valve are fitted arcuate valve discs or shoes 20 which are removable from the recesses or cutout portions of the valve when the valve is removed from the body. In the lateral passageways or diagonal ducts 13c are thrust pins 21 which are bevelled at their lower ends to conform with the rear surface of the valve discs. The upper ends of the thrust pins terminate in the junction of the ducts 13c with vertical duct 13b and are constricted in diameter somewhat to better receive downward pressure imposed upon the ball 22 by means of pressure pin 23.

The central duct 13b in valve stem 13a is threaded to receive the screw thread portion of pressure pin 23. When this pin is screwed downwardly it imposes downward pressure on ball 22 and an outward thrust on pins 21 seating the valve discs 20 against the edges of the body 10 adjacent openings 15, thus assuring a pressure-tight fit between the valve and body.

When the pressure pin 23 is screwed upwardly pressure on the ball 22 is relieved and the thrust pins 21 no longer exert pressure against the valve discs. When so relieved the valve 13 may be easily turned in the body to an open position.

Surrounding the upper portion of the pressure pin is a packing nut 24 threaded into an enlarged opening in the upper end of valve stem 13a. This opening is sufficiently deep to accommodate packing 25 positioned below the nut. The upper end of pressure pin 23 has a hexagonal head to facilitate screwing the pin downwardly when the pressure on the discs is to be increased and the valve closed.

As previously suggested, closing or opening of the valve is accomplished by fitting a wrench to the square head on top of the valve stem 13a as shown in Fig. 3.

Although the valve is shown with internally threaded end openings 15 it is contemplated as well that connections may be made with the valve body by means of bolted flanges.

On the cap 11 is formed an apertured fin-shaped ear 26 convenient for attachment of locking device made on handle.

In brief, the novel structure resides in the forming of a Y-shaped duct in the valve and valve stem and recesses in the valve in alignment with the end openings in the body. In these recesses are fitted removable discs which are seated against the body when the valve is closed by means of pressure mechanism operable externally of the valve. This pressure mechanism or assembly which seats and unseats the valve discs consists of a pressure pin screwed into the hollow neck of the valve acting upon thrust pins behind the valve discs and acted upon by a ball positioned between the upper ends of the thrust pins and the lower end of the pressure pin.

The construction provides a pressure-tight valve easily operable and simple of construction. The parts are readily replaceable, particularly the valve discs in the event they fail to function properly. When open the valve provides full round openings therethrough and when closed, sealed closures at both openings into the body.

As many possible embodiments may be made of the invention without departing from the scope thereof, it is to be understood that all matter herein set forth or shown in the drawing is to be interpreted as illustrative and not in a limiting sense.

From the foregoing it will be seen that this invention is one well adapted to attain all of the ends and obects hereinbefore set forth together with other advantages which are obvious and which are inherent to the structure.

Having thus described my invention, I claim:

1. A plug valve comprising in combination a body having valve openings, a top closure cap for said body, a valve in the body having a hollow stem extending upwardly through the cap for rotating the valve to an open or closed position, movable members carried by the valve adapted to cover the valve openings when the valve is in a closed position, diagonal ducts between the hollow valve stem and said closure members, thrust pins movable in the ducts, and means manually movable through the hollow stem and against the thrust pins to seat the closure members against the valve body independently of valve movement.

2. A plug valve comprising in combination a body having valve openings, a top closure cap for said body, a valve in the body having a hollow stem extending upwardly through the cap for rotating the valve to an open or closed position, movable members carried by the valve adapted to cover the valve openings when the valve is in a closed position, diagonal ducts between the hollow valve stem and said closure members, thrust pins movable in the ducts, a manually movable set screw threaded in the hollow valve stem, and a ball in the juncture of the diagonal ducts between the set screw and the thrust pins responsive to axial movement of the screw to simultaneously slide the thrust pins relative to the closure members.

FRANK WHEATLEY, Sr.